Dec. 13, 1955     T. H. SAWYER     2,727,102

TWIN TROLLEY CROSSOVER

Filed Oct. 7, 1950

INVENTOR.
THOMAS H. SAWYER
BY
ATTORNEY

2,727,102

Patented Dec. 13, 1955

2,727,102

TWIN TROLLEY CROSSOVER

Thomas H. Sawyer, Mansfield, Ohio, assignor to The Ohio Brass Company, Mansfield, Ohio, a corporation of New Jersey Application October 7, 1950, Serial No. 188,958

4 Claims. (Cl. 191—37)

This invention relates generally to overhead trolley systems and has particular reference to systems employing twin trolley wires of opposite polarity.

In overhead trolley systems employing twin trolley wires of opposite polarity there are many problems to be solved which have already been met in overhead systems using a single trolley wire.

Two problems are met in twin constructions, one where a pair of wires branch from the main wires as at a turnout and another problem is where two wires of opposite polarity intersect (meet) without actually crossing.

The problem covered by this application relates to the latter of the two problems and has particular adaptation for use in mines but may be used in other cases.

One object is to provide a device for guiding the current collectors on a vehicle through the crossing point of two pair of meeting trolley wires of opposite polarity.

Another object of this invention is to provide a system with means whereby two trolley wires of opposite polarity may be brought to the point of crossing with two other trolley wires of opposite polarity and the crossing successfully made by a pair of current collectors without any wires of opposite polarity becoming connected or shorted.

Another object is to provide a system having means for guiding the current collector on a vehicle through the meeting point of two pair of trolley wires of opposite polarity and provide the vehicle with current while making the crossing.

Another object of this invention is to provide a system of two spaced trolley wires of opposite polarity meeting spaced trolley wires of opposite polarity with means for guiding a pair of current collectors on a vehicle across the space between the free ends of either pair of trolley wires and provide the current collectors with current while making the crossing.

Another object is to provide a system of two pair of trolley wires of opposite polarity at their point of meeting with movable means for guiding the current collectors on a vehicle across the intervening space between the wires of either pair of trolley wires and having means to check the movement of the movable means when in alignment with either pair of trolley wires.

Another object of this invention is to provide means for energizing the conducting members on a pivotal conducting device with their proper polarity, to check the movement of the pivotal device when in proper alignment the spaced trolley wires and to maintain such alignment until intentionally changed.

Another object is to provide a system of two meeting pair of trolley wires of opposite polarity and the wires of each pair interrupted at this point of meeting, and movable means operating between the two pair of wires to guide a pair of current collectors across the gap between the interrupted wires of either pair, and the system also provided with means to energize the conductors on the movable means with their proper polarity and to check the movement of the movable member when in proper alignment with either pair of trolley wires and to maintain such alignment until intentionally changed.

In the drawing—

Figure 1:
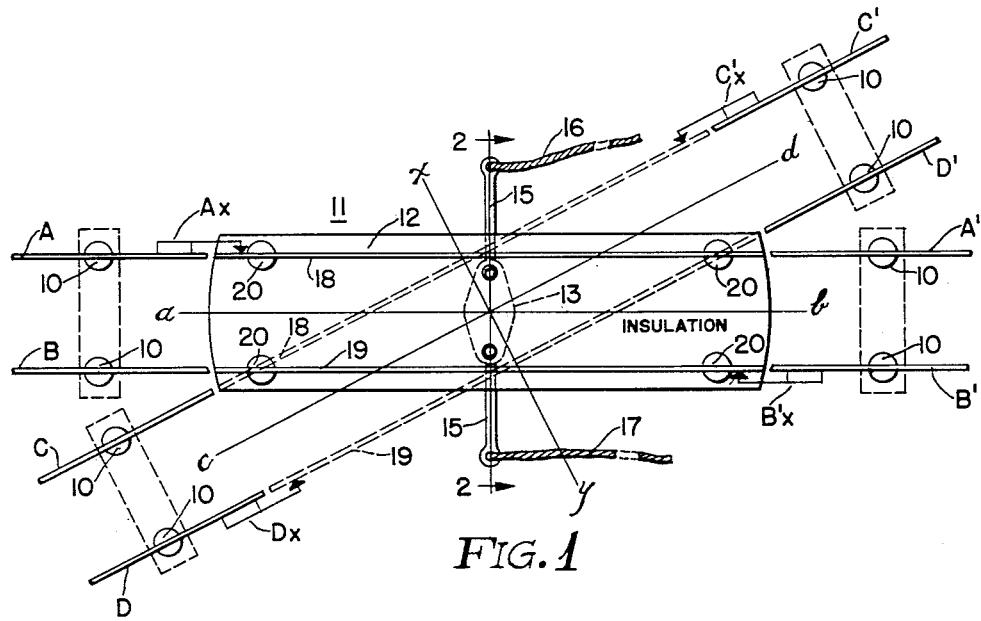
Fig. 1 is a schematic view of this invention looking at the lower or trolley wire side of the guiding means with the longitudinal space between the trolley wires of one pair of wires properly closed and energized for the guiding of a pair of current collectors on a passing vehicle across the said space.
Figure 2:
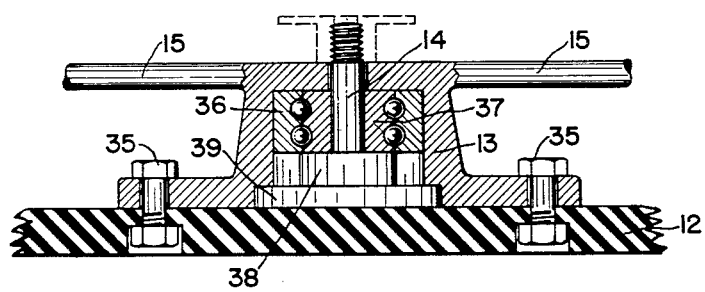
Fig. 2 is a transverse view on the line 2—2 of Fig. 1 showing a form of pivotal support for the movable bridging member.

In the system shown in Fig. 1 a pair of spaced trolley wires A—B and A'—B' meet a second pair of trolley wires C—D and C'—D'. The wires of each pair of trolley wires are of opposite polarity which make it necessary to prevent a negative or positive wire of one pair becoming connected to a wire of opposite polarity.

In the system shown, the wires of each pair of trolley wires are made discontinuous at their point of meeting therefore means must be provided for filling the gap in order to properly conduct and guide the current collectors on a passing vehicle from A and B to A' and B', and from C and D to C' and D', or vice versa.

The trolley wires are supported and anchored at or adjacent their free ends as by means of insulators 10 which may be attached directly to the roof of a mine or to intervening supports such as wood beam (shown dotted) so often found in mines. Such supports and insulators are to be found in extensive use especially in single overhead trolley constructions.

To guide and conduct the current collectors across the gap, a movable guide 11 is provided to span the gap between either pair of trolley wires, as required.

The guide consists of an insulated support or bridging member 12 of a length to extend between the free ends of each pair of trolley wires. Secured to the member 12 preferably at its center is a support member 13 provided with a pin 14 adapted to be secured to support means, and by means of which the member 12 is permitted to rotate from one position to its other position as more fully described later on.

Secured to the support member 13 are projecting arms 15 by means of which the guide 11 is pivoted to either of its positions by means of ropes 16—17 or rods. A pull on the rope 16 moves the guide 11 to the full line position shown in Fig. 1 and a pull on the rope 17 moves it to its other position.

When the guide is in the full line position of Fig. 1 its longitudinal axis a—b is parallel to the wires A—A' and B—B' and when in the position with its conductors 18—19 in the dotted position its longitudinal axis is that of c—d, and the axis of the arms 15 takes the direction x—y.

The conductors 18—19 are mounted and supported thereon in fixed relation to the member 12 by supports 20 which may be insulators if desired.

The conductors 18 and 19 are parallel and spaced apart the same distance as the trolley wires of each pair such that the trolley wires and the conductors will align when the guide is in either of its positions. The trolley wires and the conductors are a little short of their ends contacting or engaging.

In order to check the rotary movement of the guide 11 when in proper aligned relation to the trolley wires, and in order to energize the conductors 18 and 19 with their proper polarity, means is provided at the adjacent ends of certain of the trolley wires and conductors.

The check and contact means A$x$, D$x$, B′$x$ and C′$x$ are so positioned with respect to the ends of the trolley wires that the guide 11 may pivot to either of its aligned positions without interference from the check and contact means, and are shown as associated with the trolley wires, A, B′, C′ and D at or adjacent their free ends. The trolley wires A, B′, C′, and D are designated herein as outside trolley wires for ease of reference.

Figure 3:
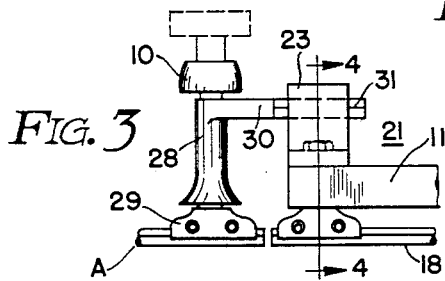
Fig. 3 is a side view of the check and contact means as shown at Ax Fig. 1 and mounted on a portion of the pivotal guide member 11.
Figure 4:
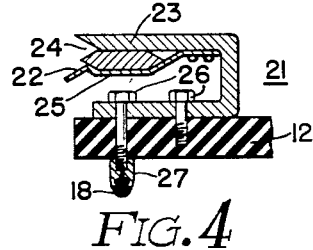
Fig. 4 is a partial section of Fig. 3 taken on the line 4—4.
Figure 5:
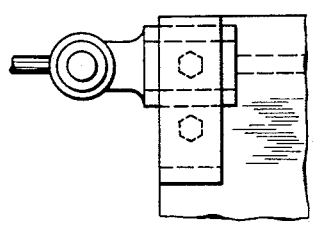
Fig. 5 is a top plan view of Fig. 3 showing the check and contact means Ax of Fig. 1 mounted on a portion of the guide 11.

The check and contact means is shown in Figs. 3, 4 and 5, the contact means comprising a support frame 21 with a leaf spring 22 secured at one end to the frame 21 and so formed that its free end is yieldable and spaced from the frame portion 23 to form a yielding opening 24 and having a detent portion 25. The support frame 21 is secured to the insulating member 12 by fastening means 26 one of which electrically engages the support 27 at the end of the conductor 18.

Secured to the end of the trolley wire A is the check means comprising a support therefor including the insulating support 10, conducting support and spacer 28 and clamp 29. The parts 10, 28 and 29 are secured rigidly together and the member 28 is provided with an integral conducting stop arm 30 with a blade 31 at the end to enter the opening 24 when the guide 11 is moved into position and yieldably held in the opening by the spring detent 25, thereby electrically connecting the trolley wire to the conductor on the bridging member.

A like construction shown in Figs. 3, 4 and 5 is installed at each corner of the guide 11 so as to cooperate with trolley wires B′ and C′ and D as well as with A thereby energizing conductors 18 and 19 in either position of the guide 11 checking rotation of the guide 11 and yieldably holding it in proper aligned position with the trolley wires.

The center support member 13 has the pin 14 adapted to be secured directly to the mine roof or to a supporting beam and is secured to the member 12 by bolts 35. The member 13 has a recess in which is mounted the ball race 36—37, the part 36 secured to the member 13 and the part 37 secured to the pin 14.

The pin 14 has a head 38 which has light engagement with the plate 39 of metal or fiber. This support permits the guide 11 to pivot or assume any position depending upon the angle of meeting of the pairs of trolley wires.

What I claim as my invention is set forth in the following claims.

I claim:

1. An overhead trolley crossover for a trolley system comprising, two pairs of trolley wires, each pair comprising spaced and parallel trolley conductors of opposite polarity having free ends adjacent a crossing, a pivotally mounted bridging member interposed between the free ends of the trolley conductors and provided with a pair of spaced and parallel conductors adapted to be aligned with the conductors of either pair of trolley wires to carry a trolley collector between the free ends of the trolley wire conductors, a fixed support for the bridging member and bearing means for permitting rotation thereof, means to pivot the bridging member and means to energize the conductors on the bridging member from either pair of trolley wires comprising separate connecting members on the outside of each of the outer trolley wire conductors and extending inwardly toward the bridging member beyond the free ends of the said conductors and contacts mounted on the bridging member at the outside of each of the conductors of the bridging member adjacent the ends thereof and projecting laterally outward to engage the connecting members on the trolley wires for electrically connecting one of the conductors of the bridging member to a trolley wire conductor at one end of the bridging member and the remaining conductor of the bridging member to the trolley conductor of the remaining trolley wire at the opposite end of the bridging member when the bridging member is aligned with either pair of trolley wires.

2. An overhead crossover for a trolley system, as set forth in claim 1, characterized in that the contacts on the bridging member are arranged for horizontally sliding contact with the connecting members on the trolley wire conductors and form abutments for engaging the said connecting members to check rotation of the bridging member and to maintain the aligned positions of the conductors on the bridging member with the trolley wire conductors.

3. A crossing device for two pairs of trolley wires in an overhead system comprising a pivotally mounted guide member movable to either of two positions, a base member of insulating material, a fixed member and rotatable bearing means attached to the base member at one side thereof for supporting the base member from the fixed member, a pair of conductors extending longitudinally across and supported from the base member in insulated relation to each other, the conductors being spaced laterally to align with either pair of trolley wires, means to pivot the guide member into alignment with either pair of trolley wires, and means for energizing the conductors of the said guide member from the trolley wires comprising laterally projecting members mounted on the base member at the outside of each of the guide conductors adjacent each end thereof and electrical connections from each of the projecting members to the associated conductor, each said projecting member including a sliding contact portion adapted to be moved into electrical contact with an associated member carried by a trolley wire and for engaging the associated member to hold the guide member in aligned position with the trolley wires.

4. An overhead trolley crossover for a trolley system comprising, two pairs of trolley wires meeting at an intersection, each pair comprising spaced parallel and insulated trolley conductors of opposite polarity having free ends at the intersection and a pivotally mounted bridging member interposed between the free ends of the trolley conductors, a pair of spaced parallel and insulated conductors on the bridging member arranged to align with the trolley conductors of either pair of trolley wires, means to pivot the bridging member, and a plurality of connecting means to energize the conductors on the bridging member when in aligned position with either pair of trolley wires including connecting members mounted on the outside of the two outer trolley conductors at each end of the intersection projecting beyond the ends of the trolley conductors and associated connecting members mounted on the outside of each of the bridging conductors at each end thereof and cooperating with the connecting members on the trolley wire conductors, the said connecting members comprising a male member electrically connected to one of the conductors and a cooperating female member adapted to receive the male member and mounted on the associated conductor, the said male and female members being received in sliding engagement whereby the electrical connection is made upon rotation of the bridging member into the aligned position.

References Cited in the file of this patent

UNITED STATES PATENTS

| | | |
|---|---|---|
| 251,341 | Haugh et al. | Dec. 20, 1881 |
| 346,990 | Finney | Aug. 10, 1886 |
| 431,095 | Wheeler | July 1, 1890 |
| 631,491 | Phillips | Aug. 22, 1899 |
| 668,151 | Baron | Feb. 19, 1901 |
| 674,660 | Wilder | May 21, 1901 |
| 889,372 | Hawley | June 2, 1908 |
| 2,150,963 | De Mask | Mar. 21, 1939 |
| 2,251,403 | Frank et al. | Aug. 5, 1941 |